United States Patent
Kumar et al.

(10) Patent No.: US 7,595,392 B2
(45) Date of Patent: Sep. 29, 2009

(54) BIODEGRADABLE OXIDIZED CELLULOSE ESTERS

(75) Inventors: Vijay Kumar, Coralville, IA (US); Yang Dong, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 56 days.

(21) Appl. No.: 10/007,866

(22) Filed: Dec. 6, 2001

(65) Prior Publication Data

US 2002/0086990 A1 Jul. 4, 2002

Related U.S. Application Data

(60) Provisional application No. 60/259,038, filed on Dec. 29, 2000.

(51) Int. Cl.
*C08B 3/00* (2006.01)
*C08B 3/06* (2006.01)

(52) U.S. Cl. ............... 536/63; 536/64; 536/67; 536/68; 536/69; 536/32; 514/54

(58) Field of Classification Search ............ 536/63, 536/64, 67, 68, 69, 32, 124; 514/54
See application file for complete search history.

(56) References Cited

U.S. PATENT DOCUMENTS

| 2,379,917 | A | | 7/1945 | Herman et al. |
| 4,590,265 | A | * | 5/1986 | Bogan et al. ............... 536/63 |
| 5,008,385 | A | * | 4/1991 | Diamantoglou ............ 536/56 |
| 5,970,988 | A | | 10/1999 | Buchanan et al. |
| 5,973,139 | A | | 10/1999 | Lee et al. |
| 5,981,738 | A | | 11/1999 | Cook et al. |

OTHER PUBLICATIONS

Chemical Abstracts, vol. 51, No. 1, Jan. 10, 1957, Columbus, Ohio, US; Abstract No. 701g, Toshikazu Fujimura et al.: "The acetylation of oxycellulose" XP002210935 abstract & Chem. High Polymers, vol. 12, 1955, pp. 315-321, XP008007015.

* cited by examiner

*Primary Examiner*—Shaojia Anna Jiang
*Assistant Examiner*—Everett White
(74) *Attorney, Agent, or Firm*—McKee, Voorhees & Sease, P.L.C.

(57) ABSTRACT

The present invention relates to the preparation of a series of oxidized cellulose esters suitable for use as a drug carrier in the development of biodegradable controlled and/or sustained release pharmaceutical, agricultural, and veterinary compositions, such as films, compacts, microspheres, and pellets. The esters are prepared by acylation of oxidized cellulose having at least 3% carboxyl groups. The resulting oxidized cellulose esters are soluble in aqueous alkaline solutions, water, and a variety of organic solvents.

1 Claim, No Drawings

BIODEGRADABLE OXIDIZED CELLULOSE ESTERS

FIELD OF THE INVENTION

This invention is related to the preparation of oxidized cellulose esters suitable for use in the development of pharmaceutical compositions.

BACKGROUND OF THE INVENTION

Oxidized celluloses containing 3-25.6% (w/w) carboxylic content represent an important class of biodegradable polymers. Ashton, U.S. Pat. No. 3,364,200 (1968). They are prepared from cellulose, the most abundant natural polymer, by treatment with an oxidant under controlled conditions. See e.g. Heinze and Glasser (1998).

Oxidized cellulose containing 16-24% is commonly and widely used in humans to stop bleeding during surgery, and to prevent the formation and reformation of postsurgical adhesions. Studies also show that such oxidized celluloses possess antibacterial activity [Abaev et al. (1986)], promote bone regeneration [Finn et al. (1992)], and are useful in periodontal therapy [Pollack et al. (1992)]. These properties have been attributed to the polyglucuronic acid structure of oxidized cellulose.

Alpaslan et al. (1997) showed that oxidized cellulose is well tolerated by soft tissues. C. C. Canvern (1996) reported that oxidized cellulose soaked with thrombin is helpful in preventing acute kinking of coronary bypass grafts and postoperative hemorrhage due to oozing from the anastomotic suture lines, devastating complications of myocardial re-vascularization. U.S. Pat. No. 5,169,840 discloses that oxidized cellulose is also useful to potentiate antibody production in response to vaccine antigens.

Oxidized cellulose has also been investigated as an immobilizing matrix for amine drugs, enzymes, and proteins. For instance, Dol'berg et al. (1974) reported the preparation, characterization and evaluation of ionic complexes of kanamycin sulfate and sulfanilamide with oxidized cellulose. Compared to free drugs, these complexes exhibited biological effects in excess of twenty days, and were readily absorbed in vivo. Adrenalone complexed with oxidized cellulose showed prolonged antiseptic and anesthetic activities and was useful for treating parodontosis. Balakleevskii (1986); Sonavaria, (1995). Firsov et al. (1987) found that the ionic complexes of lincomycin and oxidized cellulose were less irritating to the skin and mucous membranes. Implants of an ionic complex of gentamycin and oxidized cellulose showed antibiotic concentrations at the site of implantation for 30 days.

Recently, several chemotherapeutic agents, such as photrin [Kaputskii et al. (1995)], dimetpramide [Kosterova et al. (1993)], and a mixture of methotrexate and hydroxythiamine [Zimatkina (1996)], have been immobilized on oxidized cellulose and were shown to be more effective than the respective free drugs. When trypsin was immobilized on oxidized cellulose, it exhibited higher activity than when it was immobilized on phosphate or amino functionalized cellulose. Alinovskaya et al. (1989). Increased activity was also observed when proteinase, an enzyme, was immobilized on oxidized cellulose. Alinovskaya (1988).

Studies show that the carboxyl content and degree of polymerization (DP) of oxidized cellulose play important roles in the degradation of oxidized cellulose in vitro and in vivo. In general, the higher the carboxyl content, or the lower the DP, the faster the rate of degradation of oxidized cellulose. Ashton (1968). In-vitro solubilization and degradation studies have shown oxidized cellulose to be readily hydrated. About 90% of oxidized cellulose (carboxyl content 12-18%) converts to soluble substances within 21 days in a pH 7.4 buffer solution. An analysis of the resulting oxidized cellulose solution by high performance liquid chromatography (HPLC) suggests that the polymer readily undergoes chain shortening to yield oligomers. In the presence of plasma or serum, the oligomers are further hydrolyzed to small fragments, such as glucose, glucoronic acid and 2 and 3-carbon fragments. It has been suggested that the degradation of oxidized cellulose to oligomers occurs due to the presence of the carboxyl group at the C-6 position, which increases the susceptibility of the intersaccharide linkage to hydrolytic cleavage.

Dimitrijevzh et al. (1990) studied the degradation of oxidized cellulose (carboxyl content 12-18%) in vivo. They implanted oxidized cellulose onto rabbit uterine horn abrasions. Degradation was found to be rapid, and the oligomeric products produced were present primarily in the peritoneal fluid at the implantation site. No accumulation was observed in either the serum or urine. It is suggested that the degradation of oxidized cellulose involves an initial chemical depolymerization step, followed by an enzymatic hydrolysis reaction mediated by glycosidases endogenous to peritoneal macrophages.

Compared to other biodegradable polymers (e.g., poly(lactides), poly(glycolides), poly(lactide-co-glycolide) copolymers, poly (β-malic acid), etc.), oxidized cellulose has received little consideration as a potential biomaterial or drug carrier. This is because it is practically insoluble in organic solvents and water, and hence, poses little or no formulation flexibility.

Recently, U.S. Pat. No. 5,973,139 disclosed a process for producing carboxylated cellulose esters using oxidized cellulose materials containing at least 30 meq/kg, and preferably between 40 meq/kg and 70 meq/kg (about 0.14-0.3% w/w) of carboxylic content. In this process, the starting cellulose source is first esterified and then hydrolyzed to give the product. The hydroxyl content in the product ranges from 0.05 to 1.0. The carboxylated cellulose esters prepared by this method are useful in the development of coating formulations that can be applied to paper, plastic, metal, wood, gypsum board, concrete brick, masonary or galvanized sheets.

Another previous method in the art for preparing carboxylated cellulose esters uses cellulose acetate butyrate as a starting material. The carboxylic groups are then introduced by treating the polymer with ozone. Sand, 1987. A similar method is disclosed in European Patent Application No. 138, 703. The disadvantage to the carboxylated cellulose esters prepared according to these references, however, is that they are not biodegradable.

The present inventors have now prepared a series of oxidized cellulose esters that not only show solubility in aqueous alkaline buffer solutions, but also dissolve in organic solvents, and/or water, depending on the nature of the ester moiety in the polymer. Since the ester linkage undergoes hydrolysis by enzymatic and chemical means in vivo and in vitro, oxidized cellulose esters of the present invention can be used to produce a variety of biodegradable controlled and/or sustained release pharmaceutical, agricultural, and veterinary compositions.

Accordingly, it is a primary object of the present invention to provide oxidized cellulose esters that exhibit solubility in aqueous alkaline solution, water and/or common organic solvents.

It is a further object of the present invention to provide oxidized cellulose esters that are biodegradable.

It is a further object of the present invention to provide a method to modify oxidized cellulose containing 3-25% carboxylic content to produce the corresponding alkyl, aryl or mixed alkyl-aryl esters.

It is a further object of the present invention to provide oxidized cellulose esters suitable for use as an implantable and/or injectable biodegradable carrier for drugs, chemicals, and biological macromolecules such as proteins and peptides.

It is yet a further object of the invention to provide oxidized cellulose esters based compositions that may serve as controlled and/or sustained-release delivery systems.

It is still a further object of the present invention to provide oxidized cellulose ester-based film forming agents suitable for producing biodegradable medicated films for use in the treatment of skin disorders.

It is a further object of the present invention to provide an oxidized cellulose ester-based coating system useful in producing enteric-coated solid pharmaceuticals.

It is yet a further object of the present invention to provide a method of producing oxidized cellulose esters that are economical to manufacture.

The methods and means of accomplishing each of the above objects will become apparent from the detailed description, preferred embodiments, and specific examples that follow hereafter.

SUMMARY OF THE INVENTION

This invention describes the preparation and composition of oxidized cellulose esters suitable for use as film-forming agents, drug carriers, and immobilizing matrix in the development of biodegradable controlled and/or sustained release pharmaceutical, agricultural, and veterinary compositions.

In accordance with the invention, oxidized cellulose esters are produced by reacting oxidized cellulose powder containing at least 3% by weight carboxylic content with an acylating agent in an appropriate solvent at a temperature ranging between 5-125° C. for 15 minutes to 12 hours. The oxidized cellulose esters of this invention are not only soluble in aqueous alkaline solutions but dissolve in water and/or organic solvents, depending on the nature of the ester moiety and degree of substitution. In addition, they are relatively less expensive to produce than some of the most commonly and widely used biodegradable polymers.

DETAILED DESCRIPTION OF THE INVENTION

The present invention relates to the development of novel biodegradable oxidized cellulose esters. It has now been discovered that oxidized cellulose treated with an organic acid, organic acid/acid anhydride combination, or an organic acid chloride undergoes an esterification reaction to form novel biodegradable, oxidized, cellulose esters. These modified oxidized celluloses exhibit solubility in aqueous alkaline solutions, water and/or common organic solvents, such as acetone and alcohol, depending on the nature of the ester groups and degree of substitution.

In comparison to previously made oxidized cellulose esters, the products of this invention offer a new class of biodegradable polymers that may be used as biomaterials and as drug carriers in medicine, pharmaceutics, agriculture, and veterinary fields. In addition, these oxidized cellulose esters are less expensive to produce than some of the most commonly and widely used biodegradable polymers, such as poly(lactide-co-glycolide) copolymer.

The oxidized cellulose esters of this invention are capable of forming a monolithic transparent film when cast from the solution in an appropriate organic solvent or aqueous dispersion/solution in water containing small but adequate amounts of plasticizer. Due to the biodegradable nature of these oxidized cellulose esters, such solutions can be used in the preparation of biodegradable films or to produce biodegradable coatings on solid implants for controlling the release of entrapped medicament.

Owing to the presence of free carboxyl groups, the oxidized cellulose esters of this invention may also be used as prodrug carriers. Agents containing carboxylic acid, amine or hydroxyl group(s) can be linked to oxidized cellulose esters via an anhydride, amine or ester linkage. Like the parent polymer, oxidized cellulose esters of this invention are also capable of forming ionic complexes with amine drugs, proteins, enzymes, or other biological molecules, and hence may serve as an immobilizing agent for these agents. Owing to their solubility in organic solvent, oxidized cellulose esters can also be readily formulated into drug encapsulated micro- or nanospheres using conventional methods known in the art, such as spray drying, emulsification, coacervation, and reversible salting out. See. e.g. Giunchedi (1995); Watts et al. (1990); Arshady (1990); Ibrahim et al. (1992); and Allemann et al. (1992).

The oxidized esterified celluloses of this invention have the following general structures I and II:

wherein:

X is H, Na, K, Ca, $NH_4$, or $NEt_3H$;

R is H; $CF_3$; $(CH_2)_n CH_3$, where n is from 0 to 18, and preferably 0 to 5; $(CH_2)_n COOH$, where n is from 1 to 8, and preferably 2 to 4; CY=CZCOOH, where Y and Z are independently selected from the group consisting of hydrogen, methyl, branched alkyl having from 1 to 20 carbon atoms and from one to three cis or trans double bonds; branched alkenyl having from 1 to 20 carbon atoms and having from one to three cis or trans double bonds; CY=$CH_2$, where Y is H, methyl, or phenyl; CH=CHY, where Y is $C_6H_5$; CH=CYCOOH, where Y is H or $CH_3$; $(CH_2)_8$CH=CH$(CH_2)_8$CH$_3$; or $C_6H_{(2-6)}(COOH)_{0-4}$, $CH_2CH(COOH)CH_2$—COOH;

w, is 0.1-1.0;

x is 0.1-2.0; and n is 30-1500.

and

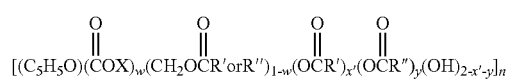

wherein:

X is H, Na, K, Ca, $NH_4$, or $NEt_3H$;

R' and R" are each selected from the group consisting of: H; $CF_3$; $(CH_2)_n CH_3$, where n is from 0 to 18, preferably 0 to 2; $(CH_2)_n COOH$, where n from 1 to 8, preferably 2 to 4; CY=CZCOOH, where Y and Z are independently selected from the group consisting of hydrogen, methyl, branched alkyl having from 1 to 20 carbon atoms and from one to three cis or trans double bonds; branched alkenyl having from 1 to 20 carbon atoms and having from one to three cis or trans double bonds; CY—$CH_2$, where Y is H, methyl, or phenyl; CH=CHY, where Y is $C_6H_5$; CH=CYCOOH, where Y is H or $CH_3$; $(CH_2)_8CH=CH(CH_2)_8CH_3$; or $C_6H_{(2-6)}(COOH)_{0-4}$; $CH_2CH(COOH)CH_2$—COOH;

w is 0.1-1.0;

x is 0.1-1.9;

y is 0.1-1.9; and n is 30-850.

Oxidized cellulose containing at least 3% by weight of carboxylic (COOH) content, and preferably 3-25% content, is used as the starting material in the manufacture of the oxidized cellulose esters of this invention. Various methods of preparing oxidized celluloses are well known in the art, and are described in the following publications, the disclosures of which are hereby expressly incorporated by reference: Heinze et al. (1998); Netherland Patent 77, 111, 034 (1979); U.S. Pat. No. 2,756,112 (1956); Walimbe et al. (1978); C. Bertocchi et al. (1995); E. V. Gert et al. (1995); and Heinze et al. (1993).

The cellulose used in the preparation of oxidized cellulose, the starting cellulose material for oxidized cellulose esters of this invention, can be from any source, including cotton linters, alpha cellulose, hard and soft wood pulp, regenerated cellulose, amorphous cellulose, low crystallinity cellulose, powdered cellulose, mercerized cellulose, bacterial cellulose and microcrystalline cellulose. Illustrative methods can be found in the following publications, the disclosures of which are hereby incorporated by reference: Powdered cellulose: U.S. Pat. Nos. 4,269,859 and 4,438,263; Low crystallinity cellulose: U.S. Pat. Nos. 4,357,467; 5,674,507; Wei et al. (1996); Microcrystalline cellulose: U.S. Pat. Nos. 2,978,446, 3,146,168, and 3,141,875, Chem Abstr. 111 (8) 59855w, 111 (8) 59787a, 108 (19) 152420y, 104 (22) 188512m, 104 (24) 209374k; CA 104 (24) 193881c, 99 (24) 196859y, 98 (12) 95486y, 94 (9) 64084d, and 85 (8) 48557u.

Prior to treatment in accordance with the methods and solvents of this invention, the oxidized cellulose is preferably treated with a swelling agent for 5-120 minutes, and preferably for about 30-60 minutes, at room temperature. The swelling agent should be used in an amount sufficient to soak the oxidized cellulose. Use of the swelling agent prior to esterification increases the rate of reaction and allows the reaction to occur at a lower temperature (by about 5-25° C.). Further, pretreatment with a swelling agent allows the esterification reaction to be conducted at a lower temperature. Examples of suitable swelling agents include, but are not limited to phosphoric acid, isopropyl alcohol, aqueous zinc chloride solution, water, amines, etc. Following pretreatment, the swelled oxidized cellulose is preferably washed with water, and then with the solvent of the reaction as described below.

The oxidized cellulose source may then be acylated in one of two manners. Method (1) involves treating the cellulose with an organic acid, either alone or in the presence of an acid anhydride. Organic acids and acid anhydrides suitable for this purpose are $C_1$-$C_5$ organic acids and/or anhydrides, with about $C_1$-$C_3$ being preferred. If an anhydride is used, it may be the anhydride corresponding to the organic acid (i.e. acetic acid/acetic anhydride), or a different anhydride. If a non-corresponding anhydride is used, the resulting oxidized cellulose ester product will be a mixed esters.

Examples of organic acids that can be used alone include formic acid, trifluoroacetic acid, and acetic acid. Examples of organic acids and their corresponding anhydrides include, but are not limited to, acetic acid/acetic anhydride, propionic acid/propionic anhydride, or butyric acid/butyric anhydride, valeric acid/valeric anhydride, caproic acid/caproic anhydride, caprylic acid/caprylic anhydride, nonanoic acid/nonanoic anhydride, capric acid/capric anhydride, lauric acid/lauric anhydride, myristic acid/myristic anhydride, palmitic acid/palmitic anhydride, heptadecanoic acid/heptadecanoic anhydride, stearic acid/stearic anhydride, arachidic acid/arachidic anhydride, behenic acid/behenic anhydride, maleic acid/maleic anhydride, succinic acid/succinic anhydride, mellitic acid/mellitic anhydride, phthallic acid/phthallic anhydride, oleic acid/oleic anhydride, linoleic acid/linoleic anhydride, leinolenic acid/leinolenic anhydride, etc.

In accordance with Method (1), the oxidized cellulose is preferably treated in the presence of an acid catalyst, for e.g. sulfuric acid, o-phosphoric acid, perchloric acid, and zinc chloride solution. If used, the acid catalyst should be present in a concentration ranging from about 0.1-10%, preferably 0.5-2%, by weight of the organic acid anhydride. In general, the higher the reaction temperature the lower the concentration of the acid catalyst, and vice versa, is required.

Method (2) involves treatment of the oxidized cellulose with an excess of an organic acid chloride or organic acid anhydride in an organic solvent such as dimethylsulfoxide (DMSO), N,N'-dimethylacetamide (DMA), N'N'-dimethylformamide (DMF), dioxane, or the like, in the presence of a base catalyst. Appropriate organic acid chlorides are $C_1$-$C_{20}$ compounds, with about $C_1$-$C_{18}$ being preferred. Specific examples of organic acid chlorides include, but are not limited to, caproyl chloride, heptanoyl chloride, octanoyl chloride, capryl chloride, undecanoyl chloride, lauroyl chloride, tridecanoyl chloride, myristoyl chloride, pentadecanoyl chloride, palmitoyl chloride, heptadecanoyl chloride, steroyl chloride, arachidoyl chloride, and behenoyl chloride. Examples of unsaturated acid chlorides include palmitileoyl chloride (cis-9), oleoyl chloride (cis-9), linoleoyl chloride (cis-9,12), linolelaidoyl chloride (trans-9,12), γ-linolenoyl chloride (cis-6,9,12), etc. Examples of unsaturated acids that can be converted to the corresponding acid chlorides by the method known in the art include undecylenic acid, myristoleic acid (cis-9), myristelaidic acid (trans-9), palmitelaidic acid (trans-9), sterolic acid (9-ynoic), etc.

Examples of appropriate base catalysts include, but are not limited to pyridine, triethylamine, pyridine derivatives, etc. The amount of the base catalyst that can be used varies from reaction to reaction, typically ranging from 2% to 20% by weight of the amount of the anhydride or acid chloride used in the reaction. In some reactions, it could also be used both as a solvent and as a catalyst.

For both Method (1) and (2), the acylating reaction should occur at a temperature ranging from about 5-125° C., and preferably between about 15-75° C. The reaction should be allowed to continue for a time period of 0.5-12 hours, and preferably between about 2-6 hours. The resulting solid is then preferably filtered, washed with water to a neutral pH range of between about pH 6-8, and then dried using conventional methods such as air-drying, vacuum drying, etc. Yields of the various oxidized cellulose esters prepared by the methods of this invention range between about 70-95%.

As a general rule, the hydrophobic character of the oxidized cellulose esters of this invention increases with increasing length of the carbon chain in the ester moiety. For instance, in the free acid form, the oxidized cellulose esters are soluble in alcohols, ketones, aqueous alcohol, aqueous acetone, DMSO, DMA, DMF, or mixtures thereof Owing to the presence of free carboxylic groups, oxidized cellulose esters of this invention are soluble in mild to strong aqueous alkali solutions. The pH at which the dissolution occurs depends on the nature of the ester moiety present in the polymer and degree of substitution. For example, oxidized cellulose acetate is insoluble in water and acidic aqueous solutions, but swells in pH 7 and higher buffer solutions, and eventually dissolves.

In comparison, oxidized cellulose maleate or other unsaturated alkyl or alkenyl substituted esters containing one or more free carboxylic groups on the ester moiety as pendant groups hydrate in water and dissolve to give a viscous solution.

The aryl substituted esters of oxidized cellulose, irrespective of the absence or presence of the free carboxylic group, neither swell nor dissolve in water. They are insoluble in acidic aqueous solutions, but dissolve in mild to strong aqueous alkaline solutions. They are soluble in alcohol, acetone, and a variety of other simple and mixed organic solvents. The mixed oxidized cellulose esters exhibit solubility intermediate to those of the parent alkyl and aryl cellulose esters.

Oxidized cellulose esters of this invention are capable of forming a monolithic transparent film when cast from the solution in an appropriate organic solvent system containing small but adequate amounts of a plasticizer or a mixture of two plasticizers. Preferred concentrations of plasticizer range from about 0.1-35% by weight. The types of plasticizers that can be used depend on the nature of the polymer being used. Examples of plasticizers included but not limited to: triethyl citrate, diethyl citrate, dibutyl phthalate diethyl phthalate, triacetin, glycerin, etc. Other formulation additives such as chemical release flux regulators and antifoaming agents can also be added to the solution. The use of a small but adequate amount of plasticizer reduces the interaction forces between polymer chains and as a result facilitates coalescence between boundaries of particles and consequently produces a homogeneous monolithic film.

Oxidized cellulose esters solutions containing drugs can be spray dried or processed by spray drying or other conventional emulsification approaches to produce microparticles/microspheres or nanoparticles/nanospheres. The general procedures for preparing such compositions are well known to those skilled in the art.

Adequately plasticized solutions of oxidized cellulose esters are also useful in coating tablets to form controlled/sustained release dosage forms. Such coatings withstand the stomach pH, but dissolve in the more alkaline pH of the small intestine. Other commonly used film forming polymers can be mixed with such solutions and used.

The formulation of pharmaceutically-acceptable dosage forms is well known in the art. As used herein, the term "pharmaceutically-acceptable" refers to the fact that the preparation is compatible with the other ingredients of the formulation and is safe for administration to humans and animals.

Oral dosage forms encompass tablets, capsules, and granules. Preparations which can be administered rectally include suppositories. Other dosage forms include suitable solutions for administration parenterally or orally, and compositions which can be administered buccally or sublingually.

The pharmaceutical preparations of the present invention are manufactured in a manner which is itself well known in the art. For example the pharmaceutical preparations may be made by means of conventional mixing, granulating, dragee-making, dissolving, lyophilizing processes. The processes to be used will depend ultimately on the physical properties of the active ingredient used.

Suitable excipients are, in particular, fillers such as sugars for example, lactose or sucrose mannitol or sorbitol, cellulose preparations and/or calcium phosphates, for example, tricalcium phosphate or calcium hydrogen phosphate, as well as binders such as starch, paste, using, for example, maize starch, wheat starch, rice starch, potato starch, gelatin, gum tragacanth, methyl cellulose, hydroxypropylmethylcellulose, sodium carboxymethylcellulose, and/or polyvinyl pyrrolidone. If desired, disintegrating agents may be added, such as the above-mentioned starches as well as carboxymethyl starch, cross-linked polyvinyl pyrrolidone, agar, or alginic acid or a salt thereof, such as sodium alginate. Auxiliaries are flow-regulating agents and lubricants, for example, such as silica, talc, stearic acid or salts thereof, such as magnesium stearate or calcium stearate and/or polyethylene glycol.

For this purpose concentrated sugar solutions may be used, which may optionally contain gum arabic, talc, polyvinylpyrrolidone, polyethylene glycol and/or titanium dioxide, lacquer solutions and suitable organic solvents or solvent mixtures.

The following examples are provided to illustrate but not limit the invention. Thus, they are presented with the understanding that various modifications may be made and still be within the spirit of the invention.

EXAMPLE 1

Preparation of Oxidized Cellulose Acetate (OCA)

(1) 2 g of oxidized cellulose (carboxylic content 13.7%) was reacted with 10 ml acetic anhydride and 10 ml acetic acid in the presence of 0.5 ml sulfuric acid at 30-40° C. for 2 hours. The reaction mixture was then poured into 50 ml ethyl ether. The resulting solid was filtered, washed with water to pH 6 and then dried in a vacuum oven at 50° C. to produce the desired product (yield 67%).

(2) 2 g. of oxidized cellulose was soaked in water for 15 min. and then washed first with acetone and then with acetic acid. The wet oxidized cellulose was then added to a mixture of acetic acid (25 ml), acetic anhydride (25 ml), and sulfuric acid (0.75 g) with constant stirring. An immediate exothermic reaction occurred and the reaction mixture turned into a clear solution. The stirring was continued at room temperature for one hour and then poured into ether. The white to off-white solid that formed was filtered, washed with water, and then dried in a vacuum oven at 60° C. (yield 94%).

The FT-IR, $^1$H NMR and $^{13}$C NMR spectral date are as follows:

FT-IR spectrum (FIG. 2): 3500-3700, 2952, 2894, 1753, 1233, and 1047 cm$^{-1}$.

$^1$H NMR spectrum (FIG. 3): 1.84-2.17 ppm and 3.5-5.5 ppm $^{13}$C NMR spectrum (FIG. 4): 167-170, 99-100, 67-76, 61-62, and 20-21 ppm.

EXAMPLE 2

Preparation of Oxidized Cellulose Succinate (OCS)

1.0 g of oxidized cellulose (COOH content 20%) was taken in 10 ml of dimethyl sulfoxide. To the stirred solution, 0.19 triethylamine was added. The reaction mixture was stirred for 10-15 min. and then 20 g. of succinic anhydride was added. The reaction mixture was then heated at 60° C. for 4 hours with stirring. To the reaction mixture, 0.1N HCl was added until the pH of the solution was between 1-3. The reaction mixture was poured into iso-propanol (50 ml). The solid precipitated was filtered, washed first with iso-propanol and then with acetone to give 0.85 g of the product (yield 85%).

The FT-IR, $^1$H NMR and $^{13}$C NMR spectral date are as follows:

FT-IR spectrum: 3443-3700, 1736

$^1$H NMR spectrum: 2.4 ppm

EXAMPLE 3

Preparation of Oxidized Cellulose Laurate (OCL)

2.0 g. of oxidized cellulose (COOH content 13%) and 20 ml of pyridine were taken in a round bottom flask and vigorously stirred. 3.0 ml of lauric chloride was then added dropwise and the reaction mixture was heated at 70° C. for four hours. The reaction mixture was then poured in acetone. The resulting solid was filtered and resuspended in warm acetic acid. The residue was filtered and washed first with water and then with acetone and finally dried in a vacuum oven at 50° C.

The FT-IR, $^1$H NMR and $^{13}$C NMR spectral date are as follows:

FT-IR spectrum: 2927, 2857, and 1754 cm$^{-1}$.

EXAMPLE 4

Preparation of Oxidized Cellulose Maleate (OCM)

3.0 g of oxidized cellulose (COOH content 20%) was taken in 15 ml of dimethyl sulfoxide. 0.57 g of triethylamine and 4.88 g of malic anhydride were then added in the order written. The reaction mixture was heated at 60° C. for six hours. It was poured in iso-propanol. The resulting solid was filtered, dissolved in a small amount of water, and then dialyzed against water to remove any water-soluble (inorganic) salts. The dialyzed sample was concentrated on a rotoevaporator to produce the desired product (2.0 g). The FT-IR, $^1$H NMR and $^{13}$C NMR spectral date are as follows:

FT-IR: 3500-3700 cm$^{-1}$, 3067, 3016, 1738, 1223, and 1061 cm$^{-1}$.

$^1$H NMR (in D$_2$O): δ 6.90, 6.30, 6.23, and 3.5-6.0 ppm.

$^{13}$C NMR (in D$_2$O): δ 173, 166, 140, 136, 122, 103, 94, 7 and 2-81 ppm

EXAMPLE 5

Preparation of Oxidized Cellulose Phthalate (OCP)

This compound was prepared according to the procedure described in Example 2. The quantities of various agents used were: oxidized cellulose (COOH content 20%; 2.0 g), triethylamine (0.38 g), and phthallic anhydride (2.5 g). The yield of oxidized cellulose phthalate was 1.8 g (90%). The FT-IR, $^1$H NMR and $^{13}$C NMR spectral date are as follows:

FT-IR: 3400-3700, 3073, 1736, 1260, and 1062 cm$^{-1}$ $^1$H NMR (in DMSO-d$_6$): δ 7.56-7.73 and 4.0-6.0.

$^{13}$C NMR (in DMSO-d$_6$): δ 173, 166, 140, 136, 122, 103, 94, and 72-81

EXAMPLE 6

Preparation of Oxidized Cellulose Acetate Phthalate (OCAP)

1.0 g of oxidized cellulose (COOH 20%) was soaked in 10 ml water for 10 min. and then filtered and washed with 10 ml dimethylformamide (DMF). The treated oxidized cellulose was then reacted with 2.8 g of phthallic anhydride in 10 ml DMF and 2 ml pyridine at 60° C. for 2 hours with constant stirring. The reaction mixture was then cooled to 55° C. To the reaction mixture then 5 ml of acetic anhydride was added and the heating was continued for two hours. The reaction mixture was then acidified with aqueous 0.1N HCl. This was followed by addition of 100 ml of iso-propanol. The resulting solid was filtered, washed with water to pH 6, and dried at 50° C. in a vacuum oven. The yield of OCAP was 1.8 g (90%).

The FT-IR, $^1$H NMR and $^{13}$C NMR spectral date are as follows:

FT-IR: 3400-3700, 3062, 2965, 2907, 1267, and 1278 cm$^{-1}$ $^1$H NMR (in DMSO-d$_6$): δ 7.6, 4.0-6.0, and 2.012-1.882.

$^{13}$C NMR (in DMSO-d$_6$): δ 169.3 (168.2-170.4), 131.7 (131-132.3), 128.8 (129), 99, 71.9 (70.9-73.2), 61.5 (60-63), 20.4 (20.33-20.45) ppm.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

All articles cited herein and in the following list are hereby expressly incorporated in their entirety by reference.

CITATIONS

I. Abaev et al., 31, 624-8 (1986).

V. A. Alinovskaya, USSR SU 1,406,161 (1988).

V. A. Alinovskaya et al., *Ser. Khim. Navuk.*, 3, 27-31 (1989).

E. Allemann et al., *Int. J. Pharm.*, 87, 247-253 (1992).

Alpaslan et al., *Brit. J. Oral & Maxillofac. Sure.*, 35, 129-32 (1997).

R. Arshady, *Poly. Eng. Sci.*, 30, 905-924 (1990);

A. I. Balakleevskii, SU 1,266,5541 (1986).

C. Bertocchi et al., *Carbohy. Poly.*, 27, 295-297 (1995).

C. C. Canvern, *J. Cardiac. Surg.*, 11, 408-410 (1996).

Dimitrijevzh et al., *Carbohydr. Res.*, 198, 331-341 (1990).

E. B. Dol'berg et al., *Khim.-Farm. Zh.*, 8, 23 (1974).

M. D. Finn et al., 50, 608-612 (1992).

A. A. Firsov et al., *Drug Dev. Ind. Pharm.*, 13, 1651-1674 (1987).

E. V. Gert et al., *Poly. Sci. Ser., A*, 37, 670-675 (1995).

P. Giunchedi and U. Conte, *S.T.P. Pharm. Sci.*, 5,276-290 (1995).

T. Heinze et al., Cellulosics: Chemical, biochemical, and material aspects, J. F. K., G. O. Philips, and P. A. Williams (editors), 349-355, Ellis Horwood, New York, (1993).

T. Heinze and W. G. Glasser, *ACS Symp. Ser.*, 688, 73-82 (1998).

H. Ibrahim et al., *Int. J. Pharm.*, 87, 239-246 (1992).

F. N. Kaputskii et al., *Colloid J.*, 57, 42-45 (1995).

R. I. Kosterova et al., *Ser. Khim. Navuk.*, 2, 12-17 (1993).

R. P. Pollack and O. Bouwsma, *Compendium*, 888, 890, 892 (1992).

Sand, "The Properties and Applications of ozonolyzed cellulose acetate butyrate," *Polym. Material Sci. Eng.*, 1987, pp 57-63.

V. J. Sonavaria, *Diss. Abstr. Int.*, 55, 3322 (1995).

V. U. Stani, Netherland Patent 77, 111, 034 (1979).

A. M. Walimbe et al., *Res. Ind.*, 23, 162-165 (1978).

P. J. Watts et al., *Crit. Rev. Therap. Drug Carrier Syst.*, 7, 235-259 (1990).

S. Wei, V. Kumar, and G. S. Banker, *Int. J. Pharm.*, 142, 175-81 (1996).

T. Zimatkina, *Polish J. Pharmacol.*, 48, 163-169 (1996).

What is claimed is:

1. A biodegradable, oxidized cellulose ester having the following general formula I or II:

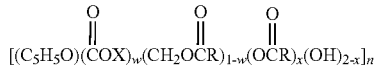   I.

wherein:
X is selected from the group consisting of H, Na, K, Ca, $NH_4$, and $NEt_3H$;
whereby R is $(CH_2)_n COOH$, where n is 2 to 4;
w is 0.1-1.0;
x is 0.1-2.0; and
n is 30-1500 and

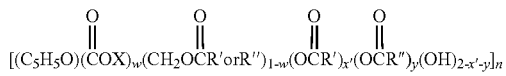   II.

wherein:
X is selected from the group consisting of H, Na, K, Ca, $NH_4$, and $NEt_3H$;
R' and R" are each selected from the group consisting of: H; $CF_3$; $(CH_2)_n CH_3$, where n is from 0 to 18; $(CH_2)_n COOH$, where n is from 1 to 8; CY=CZCOOH, where Y and Z are independently selected from the group consisting of hydrogen, methyl, branched alkyl having from 1 to 20 carbon atoms and from one to three cis or trans double bonds; branched alkenyl having from 1 to 20 carbon atoms and having from one to three cis or trans double bonds; CY—$CH_2$, where Y is H, methyl, or phenyl; CH=CHY, where Y is $C_6H_5$; CH=CYCOOH, where Y is H or $CH_3$; $(CH_2)_8 CH=CH(CH_2)_8 CH_3$; or $C_6H_{(2-6)}(COOH)_{0-4}$, $CH_2CH(COOH)CH_2$—COOH;
w is 0.1-1.0;
x' is 0.1-1.9;
y is 0.1-1.9; and
n is 30-850.

\* \* \* \* \*

UNITED STATES PATENT AND TRADEMARK OFFICE
CERTIFICATE OF CORRECTION

PATENT NO.       : 7,595,392 B2                                                  Page 1 of 1
APPLICATION NO.  : 10/007866
DATED            : September 29, 2009
INVENTOR(S)      : Kumar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-eighth Day of September, 2010

David J. Kappos
*Director of the United States Patent and Trademark Office*